May 24, 1932. C. A. BULKELEY 1,859,427
REFRIGERATING APPARATUS
Filed Aug. 25, 1930   3 Sheets-Sheet 3

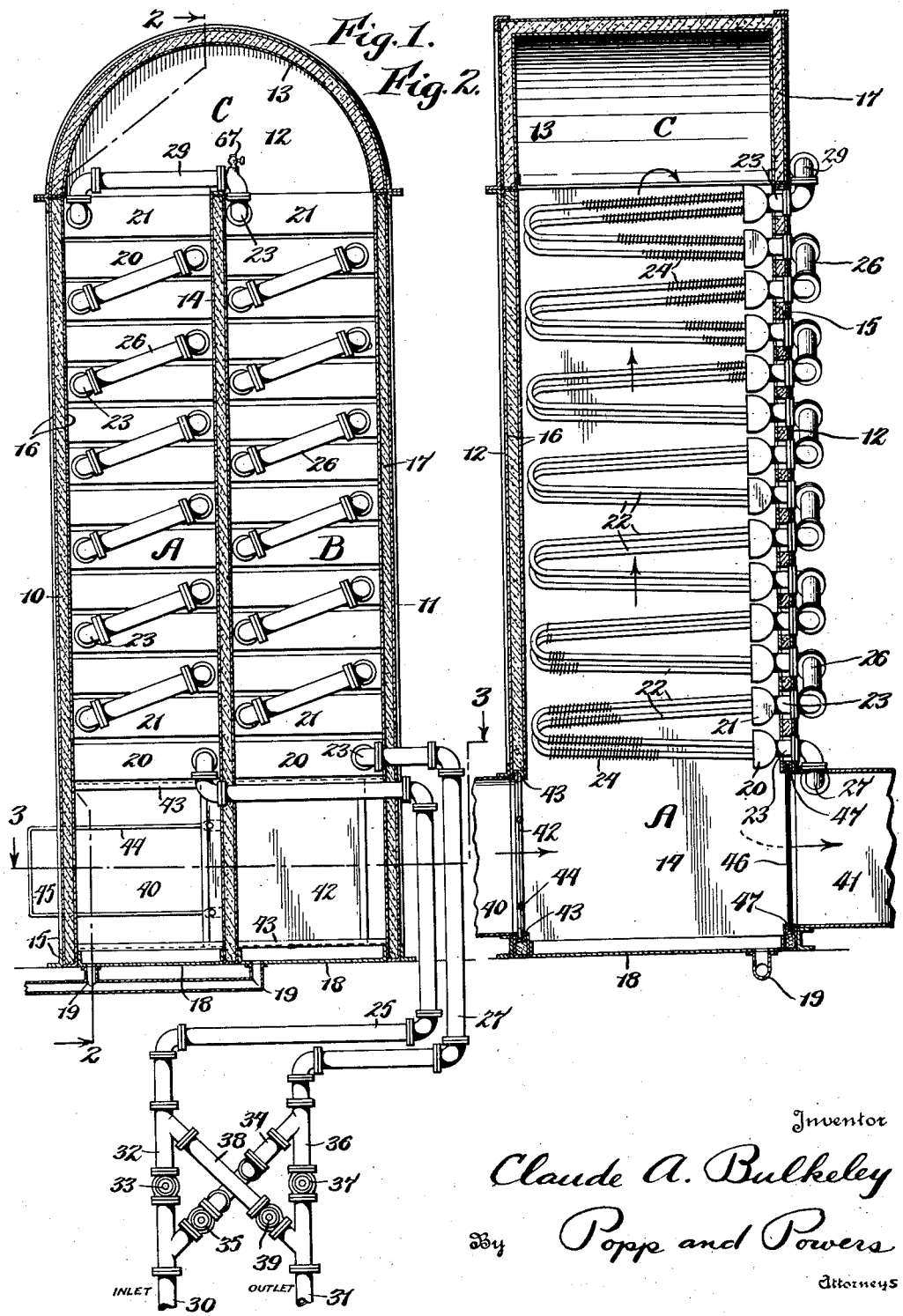

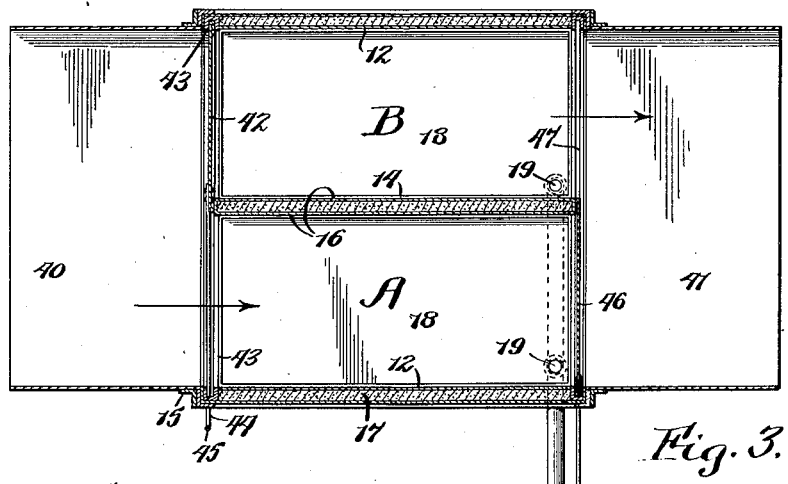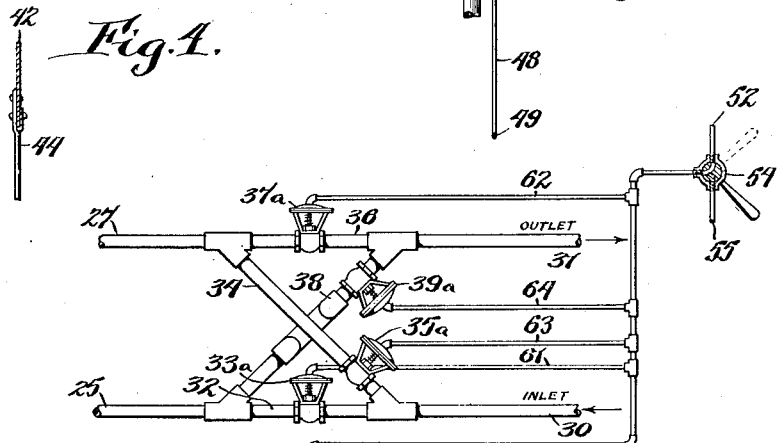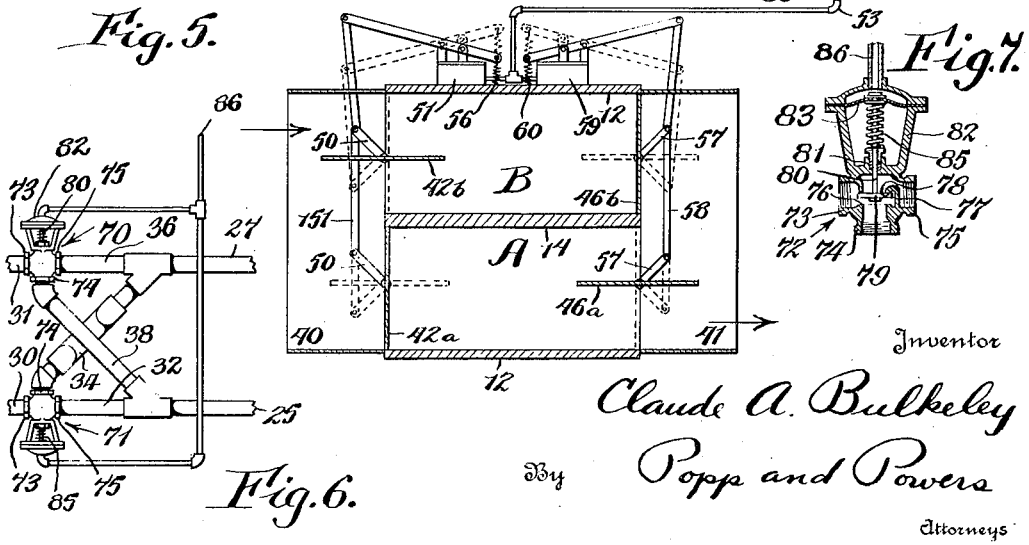

Inventor
Claude A. Bulkeley
By Popp and Powers
Attorneys

Patented May 24, 1932

1,859,427

UNITED STATES PATENT OFFICE

CLAUDE A. BULKELEY, OF KENMORE, NEW YORK, ASSIGNOR TO NIAGARA BLOWER COMPANY, OF BUFFALO, NEW YORK, A CORPORATION OF NEW YORK

REFRIGERATING APPARATUS

Application filed August 25, 1930. Serial No. 477,484.

This invention relates to a refrigerating apparatus and more particularly to such an apparatus in which comparatively large quantities of air are cooled by forcing the air through a plurality of coils which conduct a refrigerant such as brine.

One of the principal difficulties in connection with the refrigeration of air by passing the same between refrigerating coils or the like is the icing or frosting of the coils from the moisture condensed out of the air in lowering its temperature, this ice accumulating on the coils and reducing the efficiency of the heat transfer from the air to the refrigerant as well as gradually decreasing the free area of the coils resulting in irregular performance of the apparatus. Refrigerating apparatus as heretofore constructed has required periodic deicing by shutting down the apparatus until the ice melts from the coils or other refrigerating surface, after which normal operation could be resumed.

It is the principal object of the present invention to provide for the deicing of the refrigerating coils of the apparatus without interfering with the operation of the apparatus or reducing its efficiency.

Another object is to provide means for such deicing which only involves the manipulation of the brine and air valves to reverse the flow of the air and the refrigerant, these means therefore being inexpensive, simple in construction, and not liable to get out of order as well as being simple to operate.

A further aim is to provide a simple and inexpensive means whereby the operation of the valves to effect a reversal of the air and the refrigerant flow can be effected by the operation of a single valve so that upon turning this master valve from one position to the other the reversal to effect deicing is obtained.

Another object is to provide a refrigerator unit which is extremely compact, and occupies little floor space, this being effected by providing an inverted U-shaped casing through which the air is forced thereby causing it to travel past a large amount of cooling surface in a short distance of horizontal travel and at the same time permit said surface to be contained in a compact casing.

A still further aim is to provide an encased unit the cooling means within which is composed of a plurality of pairs of headers connected by hairpin tubes and the adjacent headers of each pair being coupled together so that the refrigerant flows successively through the headers and tubes and from one end of the group to the other. This method of making the refrigerating surface in units permits of standardizing the construction of the principal element of the apparatus, renders the apparatus adaptable as to capacity and renders repairing easy.

Another purpose is to provide a refrigerating apparatus in which fin surface tubing is employed to effect the transfer of heat between the refrigerant and the air, this tubing by reason of its extended surface providing the most efficient heat transfer and the ready deicing of the apparatus permitting of its use since excessive icing of the extended surface can be readily avoided.

Another aim is to provide a casing having two chambers or compartments connected at one end and each adapted to be connected to an air inlet and an air outlet at their opposite ends. By this means the reversal of the air flow to effect deicing, can be effected by a simple system of valves which connect one chamber with the air inlet and the other with the air outlet and vice versa.

Another aim is to provide such a deicing refrigerating unit which can be designed to deice while in operation and while effecting a cooling from a very high temperature to a very low temperature where to deice the brine must be cut off completely.

Other objects are to provide a refrigerating apparatus which is compact, inexpensive, easily made and installed, is readily repaired and will operate for a long time at full efficiency without getting out of order or requiring repairs.

In the accompanying drawings:

Figure 1 is a vertical cross section of a refrigerator unit embodying my invention.

Figure 2 is a vertical section taken on line 2—2, Fig. 1.

Figure 3 is a horizontal section taken on line 3—3, Fig. 1.

Figure 4 is a fragmentary horizontal section through one of the air slide valves employed in the form of the invention shown in Figures 1–3 and showing the same detached from the rest of the apparatus.

Figure 5 is a modified form of the invention showing, diagrammatically, an air pressure control for effecting deicing of the refrigerating apparatus through the operation of a single valve.

Figure 6 is a diagrammatic representation of a modified form of brine flow reversing system suitable for use in connection with my invention, this system showing two diaphragm three way valves in place of the four one way valves shown in the other forms of my invention.

Figure 7 is an enlarged section through a three way valve suitable for use in the system shown in Fig. 6.

Similar reference numerals refer to like parts in each view.

Figure 8:
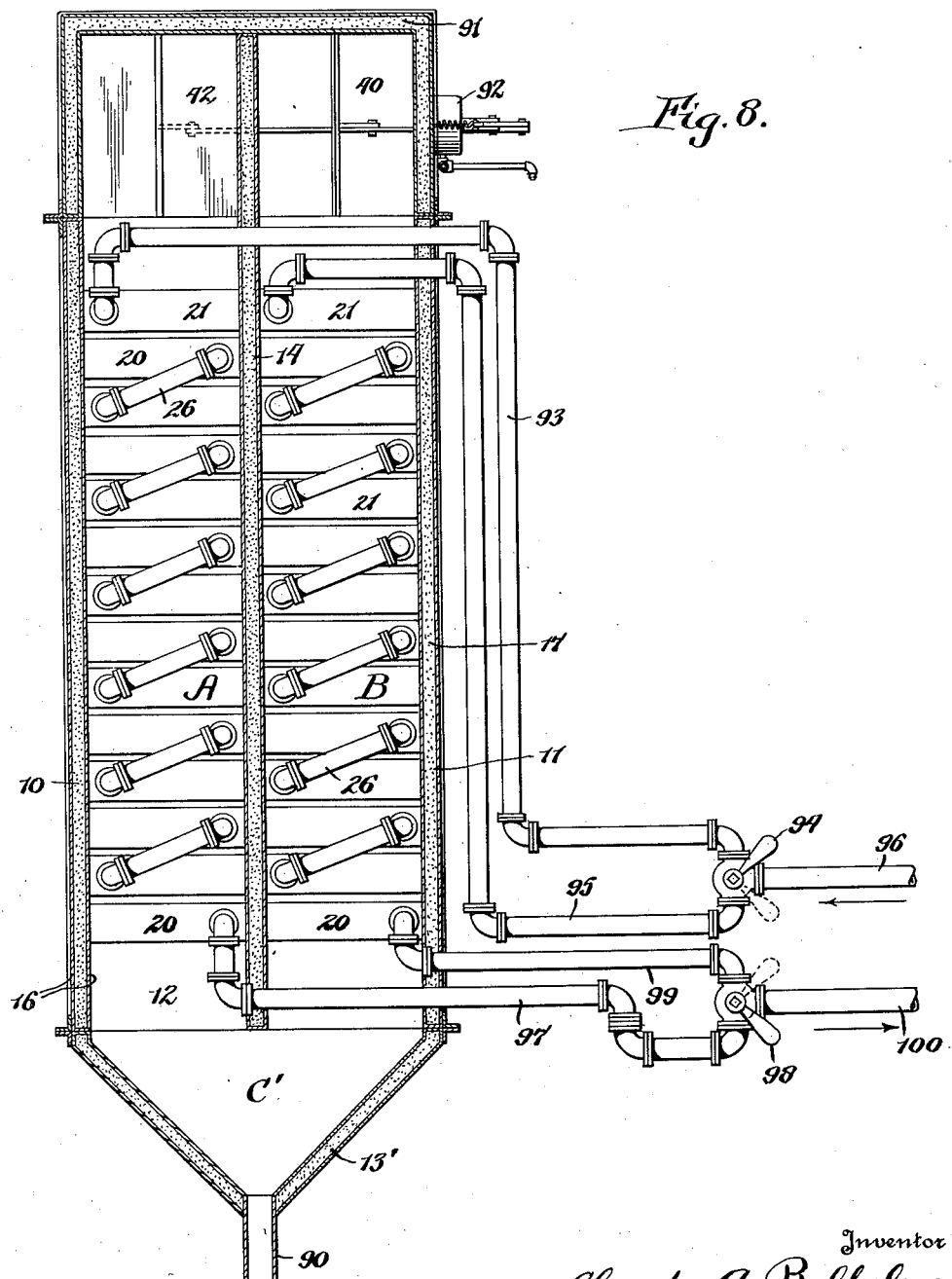
Figure 8 is a view similar to Fig. 1 showing a modified form of the invention which is adapted for use where air is cooled from a high temperature to a very low temperature and where complete deicing could not be effected with the forms shown in Figures 1–7 while in operation.

In its general organization this invention comprises a casing having a central partition arranged therein to form an inverted substantially U-shaped passage for the air to be cooled, a plurality of refrigerant coils arranged in said passage, the refrigerant flowing from one end of said passage to the other, valves for reversing the flow of refrigerant, an air inlet and an air outlet duct adapted to communicate with both ends of said passage, and valves for reversing the communication of the ducts with the ends of the chamber so that in either direction of the refrigerant flow the air can be made to pass in a reverse direction. By the reverse flow of air and refrigerant the warm air and the warm refrigerant are together and the icing of the coils takes place at the opposite end of the air passage, i. e. where the cold air and cold refrigerant are together; when the flow of both refrigerant and air are reversed, the conditions are reversed, the iced coils at one end of the passage melt and are deiced and the opposite coils at the opposite end of the passage ice. By the simple reversal of flow of the refrigerant and the air the coils ice up and are deiced at the same time and are therefore kept comparatively free from ice with continuous operation. The invention also comprehends an air pressure control system for reversing the air and refrigerant valves from a single master valve and also comprehends other details of construction which will presently appear. The invention also comprehends a construction in which two separate refrigerating units are employed and in which the deicing is obtained by the reversal of the counterflow of air and brine, as described, together with rendering one of the units completely inoperative. This construction is employed where the brine must be completely shut off to effect deicing and cannot be effected by the reversal of the counterflow of air and brine.

In the forms of the invention shown in Figs. 1–7, the casing for the refrigerating apparatus includes a front wall 10, a rear wall 11, side walls 12, a rounded top or hood 13 which arches upwardly from the side walls, and a central partition 14 which is connected with the side walls 12 and extends up to but not into the hood 13. This casing is supported by suitable angle irons 15 and each of the walls, the partition and the hood are made of two spaced sheet metal facings 16 and an insulating filler 17 between the facings, such filler being of ground cork or of other suitable material. This arrangement of walls, hood and partition therefore provides a U-shaped casing having two chambers A and B and the hood 13 forming a rounded connecting passage C between these chambers. The bottom of each of these chambers is closed by a pan 18 which catches the water from the melting ice on the coils and each is provided with a drain 19 to conduct this water away.

In each of the chambers A and B is arranged a series of coils which are connected and arranged to conduct the refrigerant, such as cold brine, in opposite directions through the chambers or from one end of the U-shaped passage to the other. As illustrated, these coils consist of a plurality of pairs of headers 20 and 21 each pair being connected by a plurality of hairpin tubes 22. Each of these headers is shown as made of welded steel having a nipple 23 and the hairpin tubes 22 are welded to these headers and are arranged in two series, the tubes of one series being staggered relative to the tubes of the other series. For the purpose of readily removing the different coil units, which are stacked, the hood 13 can be removed and the nipples 23 of each header 20 or 21 extends through the adjacent wall 12 so that upon uncoupling these nipples, the coil units can be lifted, one after the other, out of the casing.

Each of the tubes is provided with an extended or fin surface 24, this extended surface being shown as being the usual spirally wound fins. Such fin surfacing has been found entirely practicable with the present system as the ease of deicing without interfering with the operation of the apparatus renders it easy to prevent icing to such an extent as to fill the spaces between the fins and thereby destroy the increased efficiency of extended surface tubing. The fins are, however, substantially equal in height to the space between them so that each channel formed by the fins ices equally on all sides and thereby provides for the maximum icing with the minimum reduction of the efficiency of the tubes.

The headers are shown as arranged in tiers in each of the chambers A and B, and as shown, seven pairs are employed, but it is apparent that this number is determined by the requirements of the apparatus. The lower header 20 of the row or tier of pairs of coil units in the chamber A has its nipple 23 connected to a brine pipe 25, and each of the headers 21 is connected by a pipe or conduit 26 with the next succeeding header 20 of the next higher pair of headers. In a similar manner the lowest header 20 of the group of coils in the chamber B has its nipple 23 connected to a brine pipe 27. Each of the pipes 25, 26 and 27 is arranged outside of the casing, as illustrated in Figure 2 and connects to the nipples 23 which project through the casing. By this means the pipes 25, 26 and 27 can be readily disconnected, and the stacked coil units removed from the casing by removing the hood 13 and lifting the coil units from the casing shield. The uppermost headers 21 in each chamber A and B have their nipples 23 connected by a cross pipe 29. To permit of venting the coils or to remove the air which accumulates at the top of the coils, an air valve, or petcock 67 is provided in the cross line 29 which upon being opened permits the trapped air to escape from the brine system. With this arrangement, assuming that the brine is flowing from the brine pipe 25 to the brine pipe 27, it is apparent that the cold brine will enter from the brine pipe 25 to the lowest header 20 in the chamber A, will flow through the extended surface hairpin tubes 22 connecting this header with its outlet header 21 and will leave through the pipe 26 connecting this header 21 with the next succeeding header 20. The brine then flows in the same manner through the headers 20, tubes 22, headers 21 and pipes 28 up through the chamber A and enters the cross pipe 29 where it enters the uppermost header 21 of the series of coils in the chamber B. In the chamber B the brine flows downwardly passing through the headers 21, tubes 22, headers 20 and conduits 26 of each coil unit. The brine which has been warmed by its passage through the coils thereupon leaves through the lowermost header 20 in the chamber B and the brine pipe 27.

This flow of the brine is adapted to be reversed by means which as shown in Figure 1 are preferably constructed as follows:

The numeral 30 represents a brine inlet line and the numeral 31 represents a brine outlet line. The brine inlet line 30 is connected by a pipe 32 containing a valve 33 with the brine pipe 25 and by a cross pipe 34 containing a valve 35 with the brine pipe 27. In a similar manner the brine outlet line 31 is connected by a pipe 36 containing a valve 37 with the brine pipe 27 and by a cross pipe 38 containing a valve 39 with the brine pipe 25. With the valve 33 and 37 open and the valves 35 and 39 closed, it is apparent that the cold brine will flow from the brine inlet line 30 through the pipe 32, valve 33, brine pipe 25, up through the coils in chamber A, down the coils in chamber B and the warm brine will leave through the brine pipe 27, pipe 36, valve 37 and brine outlet line 31. When the valves 35 and 39 are opened and the valves 33 and 37 are closed, the brine flow will be reversed, the cold brine from the brine inlet line 30 flowing through the cross pipe 34, valve 35, brine pipe 27, up through the coils in the chamber B, down through the coils in the chamber A and the warmed brine leaves through the brine pipe 25, cross pipe 38, valve 39 and brine outlet line 31.

The warm air to be cooled is received from an inlet air duct 40 and is discharged through an air outlet duct 41. The air inlet duct 40 is arranged to communicate with both the chamber A and the chamber B, the chamber with which it communicates being controlled by a slide valve 42. This slide valve is arranged in a track composed of two channels 43 extending transversely across the duct and is of such size as to extend alternately across and cover the opening to the chamber A and to the Chamber B, cutting off access to one chamber in each position. The slide valve 42 is provided with a pair of bars or rods 44 which extend out through suitable openings provided in the sides of the inlet duct 40 and are formed to provide a handle 45 by which the rods 44 and slide valve 42 are slid from one position to the other. In a similar manner the air outlet duct 41 is arranged to communicate with both the chamber A and the chamber B, the chamber with which it communicates being controlled by a slide valve 46. This slide valve 46 is arranged in a track composed of two channels 47 extending transversely across the duct and is of such size as to alternately extend across and cover the opening to the chamber A and to the chamber B. The slide valve 46 is provided with a pair of bars or rods 48 which extend out through suitable openings provided in the sides of the air outlet duct 41 and are formed to provide a handle 49 by which the rods 48 and the slide valve 46 are slid from one position to the other.

With the above arrangement, assuming 5000 cubic feet of air per minute to be cooled from 95° to 20° dry bulb and from 77° to 19° wet bulb, and also assuming the air inlet slide valve 42 to close off the chamber B and the air outlet slide valve 46 to close off the chamber A and the brine valves 33 and 37 closed and the brine valves 35 and 39 open, the operation is as follows:

The brine enters from the inlet line 30 at 10°, passes through the cross pipe 34, valve 35, brine pipe 27 and enters the cooling coils flowing upwardly successively through the coils in the chamber B and downwardly through the chamber A. In passing through these coils its temperature is raised from its initial temperature of 10° to 40° at which temperature it flows back through the brine pipe 25, cross pipe 38, valve 39 to the brine outlet line 31. The air from the inlet duct 40 enters at the bottom of the chamber A, passes up past the coils, through the passage C, down the chamber B and out through the outlet duct 41. In doing so its temperature is lowered from 95° to 20° and its wet bulb temperature is lowered from 77° to 19°. Since the outgoing air is the coldest and since the incoming brine is the coldest it is apparent that the coldest air and the coldest brine occur at the same part of the cooling coils, i. e. in the chamber B. It therefore follows that these coils will frost or ice up whereas the coils in the chamber A which carry the warmest brine and are exposed to the warmest air will not frost.

After the coils in the chamber B have frosted up to an extent which materially reduces their efficiency, the operator reverses all of the valves i. e. he moves the air inlet slide valve 42 to close off the incoming air to the chamber A and admit it to the chamber B; he moves the air outlet slide valve 46 to close off the chamber B to the exhaust duct and open the chamber A to this duct and he opens the brine valves 33 and 37 and closes the brine valves 35 and 39.

In this position of the valves the brine at 10° flows from the inlet line 30, through the pipe 32, valve 33, brine pipe 25, up through the coils in the chamber A, down the coils in the chamber B where its temperature is raised to 40° and back through the brine pipe 27, pipe 36, valve 37 and brine outlet line 31. At the same time the direction of the air flow is reversed, the air from the inlet duct 40 entering the chamber B passing through the hood C, down the chamber A and out through the duct 41. In this position of the valves it is apparent that conditions are reversed; that the warmest air and the warmest brine are in chamber B and that therefore the ice or frost on these coils melts and that the coldest air and coldest brine occurs in the chamber A and hence the coils in this chamber start to ice up.

It will be noted that in either case the air flow is reverse to the brine flow and that to secure the deicing effect both air and brine are reversed as to their direction of flow. It will also be noted that the deicing is effected without interrupting or reducing the operation of the apparatus and that therefore not only is the disadvantage of closing down the equipment to deice or defrost avoided but extended surface thin walled tubing can be employed in the coils which increases the efficiency of the heat transfer and renders it possible to make the apparatus more compact.

In Fig. 5 is illustrated, diagrammatically, an air control for operating the air and brine valves to reverse the flow of air and brine in defrosting, this reversal being effected through the operation of one master air valve. As shown, a pair of butterfly valves 42a and 42b are substituted for the slide valve 42 in the form shown in Fig. 1, and these butterfly valves are coupled together by arms 50 and a link 151 so that when one is closed the other is open and hence air alternately admitted to the chambers A and B from the air inlet duct 40. The valve 42b is closed and the valve 42a opened by air pressure introduced to a motor 51 from an air pressure line 53 which line connects with a master valve 54. This valve in the full line position shown in Fig. 5 connects the air line 53 with the atmosphere through an exhaust line 52 and in its dotted line position connects the air line 53 with an air pressure supply line 55. When the air pressure in the line 53 is exhausted, a spring 56 opens the valve 42b and closes the valve 42a, as shown.

In the same manner a pair of butterfly valves 46a and 46b are substituted for the slide valve 46 of the form shown in Fig. 1, these butterfly valves operating reversely through arms 57 and a link 58, the valve 46a being closed and the valve 46b being opened through air pressure in a motor 59 supplied from the air line 53 and these butterfly valves being normally held in the reverse position by a spring 60.

Each of the hand valves 33 and 37 in the form shown in Fig. 1 is substituted by a direct acting diaphragm valve 33a and 37a, these diaphragm valves being held closed through air pressure in air lines 61 and 62 connected with the air line 53 and each of the hand valves 35 and 39 of the form shown in Fig. 1 is substituted by a reverse acting diaphragm valve 35a and 39a, these diaphragm valves 35a and 39a being held open through air pressure in air lines 63 and 64 connected with the air line 53.

With this organization, assuming the master valve 54 to be in the full line position shown in Fig. 5, the air line 53 is exhausted to the atmosphere. In this position, the direct acting diaphragm brine valves 37a and 33a are open; the reverse acting diaphragm brine valves 39a and 35a are closed; the butterfly valves 42b and 46a are open and the butterfly valves 42a and 46b are closed. In this condition brine flows from the inlet 30, pipe 36, direct acting diaphragm brine valve 33a, brine pipe 25, up the coils in chamber A, down the coils in chamber B and out through the brine pipe 27, pipe 36, direct acting diaphragm brine valve 37a and through the brine outlet line 31. At the same time the air entering past the valve 42b, passes up the chamber B, through the passage C in the hood 13, down the chamber A and out past the valve 46a and through the air outlet duct 41. By this arrangement the coldest air and coldest brine occurs in the chamber A and the warmest air and warmest brine occurs in chamber B and consequently the coils in chamber A begin to frost.

To defrost the coils of chamber A, the master valve 54 is moved to the dotted line position shown in Fig. 5 in which position air pressure from the supply line 55 is admitted to the air line 53; the direct acting brine valves 37a and 33a are closed, the reverse acting diaphragm brine valves 39a and 35a are opened; the butterfly air valves 42a and 46b are opened and the butterfly air valves 40b and 46a are closed by their motors 51 and 59.

In this position the flow of the brine and the opposite flow of the air to be cooled are both reversed, the brine flowing from the brine inlet line 30, cross pipe 34, reverse acting diaphragm valve 35a, brine pipe 27, up the coils in chamber B, down the coils in chamber A and out through the brine pipe 25, cross pipe 38 and reverse acting diaphragm valve 39a to the brine outlet line 31. The air now enters the chamber A past the open butterfly valve 42a, passes through the passage C, down the chamber B and out through the outlet duct 41, past the butterfly valve 46b. Since now the warmest air and the warmest brine occur in chamber A, the ice or frost on the coils in this chamber melts and drips to the pan 18 while the coils in this chamber B start to frost. It is therefore apparent that by a simple air control the deicing can be effected by the operation of a single valve.

Instead of employing four single way valves, either in the hand operated form shown in Fig. 1 or in the air operated form of the invention shown in Fig. 5, two three-way valves can be employed. In Fig. 7 is illustrated a diaphragm three-way valve suitable for this purpose and in Fig. 6 is illustrated the manner in which such diaphragm three-way valves are mounted in the brine system to permit of the desired reversal in flow of the brine.

Two three-way valves 70 and 71 are employed instead of the four valves shown in the other forms of the invention. These three-way valves can be connected in any suitable manner, and as shown, the three-way valve 70 has its three nozzles connected with the brine return line 31, the cross pipe 38 and the pipe 36 and the other three-way valve 71 has its three nozzles connected with the brine supply pipe 30, cross pipe 34 and pipe 32. These three-way valves can, of course, be hand operated, but are shown as three-way diaphragm air valves which are actuated by air pressure in a line which is controlled by a master valve such as the master valve 54 shown in Fig. 5. As shown in Fig. 7, each of the three-way diaphragm valves 70 and 71 is constructed as follows:

The diaphragm three-way valve shown in Fig. 7 consists of a body 72 having nozzles 73, 74 and 75. At the inner end of the nozzle 74, the body 72 is formed to provide an annular seat 76 and a cross partition 77 is also formed integrally across the valve body, this partition being formed to provide a valve seat 78 surrounding an opening therein and opposing the seat 76 around the nozzle 74.

A valve disk or head 79 is arranged between these seats 76 and 78 and is adapted to be alternately seated thereon, thereby alternately to establish communication between the nozzles 73 and 74 (when the disk is seated on the seat 78) and between the nozzles 73 and 75 (when the disk is seated on the seat 76). The disk 79 is mounted on a plunger 80 which extends through the body of the valve and moves the disk from one seat to the other, the usual gland or stuffing box 81 being provided to prevent leakage.

To operate these valves 70 and 71 by air pressure a head 82 is mounted on the valve body 72 and in this head is arranged a diaphragm 83 which is connected to the end of the plunger 80 and upon being distended by air pressure moves the plunger inwardly and seats the disk 79 upon the seat 76. A helical compression spring 85 is also connected to the plunger 80 and urges it outwardly so that upon release of the air pressure on the diaphragm 83 the plunger 80 is moved outwardly and the disk 79 is seated on the seat 78. Air pressure to each of the diaphragms 83 is admitted through a line 86; and the air pressure to these lines can be admitted and exhausted by means of a valve such as the master valve 54 shown in Fig. 5 or in any other suitable manner.

The three-way valve 70 is arranged with its nozzle 73 connected with the brine return line 31; its nozzle 74 connected with the cross pipe 38 and its other nozzle 75 connected with the direct pipe 32. In a similar manner, the three-way valve 71 has its nozzle 73 connected with the brine supply line 30; its nozzle 74 with the cross pipe 34 and its nozzle 75 connected with the pipe 32.

With this arrangement when there is no air pressure in the line 86 each of the valve disks 79 is seated on the seat 78 by the springs 85 and cut off the nozzle 75 from each of the nozzles 74 and 73. Under this condition of both valves, the brine flows from the brine supply line 30 through the nozzle 73 of the valve 71 past its valve seat 76 and through its nozzle 74 into the cross pipe 34, brine pipe 27 and thence through the refrigerating coils, returning through the brine pipe 25, cross pipe 38, nozzles 74 and 73 of the valve 70 to the brine outlet line 31.

When air pressure is, however, admitted to the line 86, the diaphragm of each valve 70 and 71 moves the plunger 80 inwardly and seats the disk 79 on the seat 76. Under these conditions the brine flows from the brine inlet line 30, nozzle 73 of the valve 71, past the seat 78 and out through its nozzle 75 where it passes to the pipe 32, brine pipe 25 and through the refrigerating coils, returning through the brine pipe 27, pipe 36, nozzles 75 and 73 of the valve 70 and thence to the brine return line 31.

It is, therefore, apparent that the reversal of the flow of brine can be effected by two three-way valves which can be either air or hand operated and are adapted for use in the system embodying the present invention in the same manner as the four valves shown in the other forms of the invention.

The form of the invention shown in Fig. 8 embodies the reversal of the counterflow of air and brine to effect deicing and in addition is designed to effect a complete cutting off of the brine to one-half of the coils each time the reversal to deice is effected, the flow of brine through the two halves of the coils being effected at the same time that the reversal in the brine and air flow is effected. This form of the invention is used, for example, where the air is to be cooled from slightly above freezing to substantially below, such as from 35° F. to 5° F. Under these circumstances the entering air has little melting effect as its temperature is so low, and therefore to effect deicing of the coils while in operation it is necessary to cut off completely the flow of brine through the half of the coils which the entering air encounters. Such an installation, in which the reversal of the counterflow of air and brine to effect deicing is also employed, is shown in Fig. 8.

As in the other forms of the invention, the casing for the refrigerating apparatus includes insulated front and rear walls 10 and 11 and side walls 12 and a central partition 14 which forms with the casing walls chambers A and B. Instead of employing the rounded hood 13 at the top of the unit to connect these chambers A and B, as in the form shown in Figs. 1 and 2, this connection is effected by a drip pan 13' which forms a connecting passage C' between the chambers A and B. This drip pan 13' has a drain 90. The upper end of the casing is enclosed by an insulated top 91, and the reversal of air flow through the chambers A and B and around the passage C' is effected, as in the form shown in Figs. 1 and 2, by a pair of slide valves, one being shown in Fig. 8, this slide valve 42 being adapted to cut off alternately the chambers A and B from communication with the air inlet duct 40 and another (not shown) being employed to cut off the chambers B and A from the outlet duct in reverse order. These slide valves are shown as operated in reverse order by an air motor 92 so that upon introducing pressure to the air motor, the inlet slide valve 42 will, say, be moved to introduce the air from the inlet duct 40 to the chamber B and the outlet slide valve will be moved to permit the exhaust of air from the chamber A and when the air pressure in the motor 92 is relieved, the inlet slide valve 42 will be moved to introduce the air to be cooled to the chamber A and the outlet slide valve will be moved to exhaust this air from the chamber B, or in other words reverse the air flow in the same manner as in the form of the invention shown in Figs. 1 and 2.

As in the form shown in Figs. 1 and 2, in each of the chambers A and B is arranged a series of coils which conduct the refrigerant, such as cold brine, in opposite directions from the chambers or from one end of the U-shaped passage to the other. As in the form shown in Figs. 1 and 2, these coils consist of a plurality of headers 20 and 21 each pair being connected by a plurality of hairpin tubes (not shown) and the several units composed of a header 20, a header 21 and its connecting hairpin tubes being connected in series with one another by pipes 26 to form two stacks of coils, one in each of the chambers A and B and through which brine can flow from the top to the bottom or from the bottom to the top.

The uppermost header 21 in chamber A is connected by a brine pipe 93 with one outlet of a three way valve 94 and the other outlet of this three way valve 94 is connected to the uppermost header 21 in the chamber B by a brine pipe 95. The inlet of the three way valve 94 is connected to a brine supply pipe 96. In a similar manner, the lowermost header 20 in chamber A is connected by a brine pipe 97 with one inlet of a three way valve 98 and the other inlet of this three way valve 98 is connected to the lowermost header 20 in the chamber B by a brine pipe 99. The outlet of the three way valve 98 is connected to a brine return pipe 100.

Assuming the coils or hairpin tubes in chamber A to be iced, which would occur relatively rapidly under the conditions assumed, i. e., cooling air from 35° F. to 5° F., the operator would operate the air motor 92 to move the inlet slide valve 42 to cut off communication between the inlet duct 40 and the chamber B and thereby open communication between this duct and chamber A. This movement of the air motor 92 would also move the air outlet slide valve to close off communication between the upper end of chamber A and the air outlet duct and open communication between the upper end of chamber B and the outlet duct. It is therefore apparent that air would flow down the chamber A, around the passage C' and up the chamber B. At the same time the operator moves the brine inlet valve 94 to cut off the brine pipe 93 and admit brine from the brine inlet pipe 96 to the brine pipe 95 and also moves the brine outlet valve 98 to open communication between the pipe 99 and the brine return pipe 100 and cut off the brine pipe 97. This results in brine being cut off to the slack of coils in chamber A and a flow of brine being established from brine supply pipe 96, valve 94, brine pipe 95, down the coils in chamber B, through brine pipe 99, outlet valve 98 and out through the brine return pipe 100. The warm air entering the top of chamber A encounters the unrefrigerated or dormant stack of coils in chamber A and since there is no refrigerant pressing through these coils it melts the ice on them. This precools this air and at the same time the water from this ice is carried downwardly by the airflow and is left in the drip pan 13'. The air then encounters the lowermost refrigerated coils in chamber B. Since the brine flows downwardly through these coils, the warmest brine is at the bottom and the air in flowing upwardly encounters coils cooled by colder and colder brine until it leaves through the outlet duct at the top of chamber B. This is, of course, essential.

This operating condition is continued until the coils in chamber A are completely deiced and the coils in chamber B iced. The operator then reverses all the valves, causes a down flow of brine through the stack of coils in chamber A only and effects a reversal in the flow of air down chamber B and up chamber A. The dormant coils in chamber B are then deiced and the cooling is effected by a counterflow of air and brine in chamber A.

It is apparent that with this system the counterflow of air and brine is employed as in the form shown in Figs. 1 and 2 but the temperature of the air being so little above freezing it is necessary to render half the coils completely dormant to effect their deicing by the incoming air. It is therefore to be used where unusual conditions obtain such as cooling the air from slightly above freezing temperature to way below.

It will also be understood that the operation of the valves and motor in the form of the invention shown in Fig. 8 can be effected from a single master valve such as the master air valve 54 shown in Fig. 6, by a similar arrangement of air pressure controlling devices.

As a whole each of the various forms of this invention is extremely compact and inexpensive to construct and install, the deicing or defrosting of the coils can be effected without interruption of its operation, the reversal of the valves to effect this deicing is accomplished easily and the ready deicing permits of the use of thin walled extended surface tubing in the cooling coils and the fabrication of the coils from a plurality of pairs of headers connected by such tubes and of hairpin form which greatly decreases the manufacturing cost of the apparatus, particularly when different sizes are required. The invention can also be embodied in a form to cool air from relatively high temperatures above freezing to below freezing or it can be embodied in a form to cool the air slightly above freezing temperature to way below freezing.

I claim as my invention:

1. A refrigerating apparatus including a refrigerant conducting means, means for conducting the medium to be refrigerated progressively past said refrigerant conducting means in a reverse direction to the flow of the refrigerant and means for reversing the flow of both the refrigerant and the medium to be refrigerated.

2. A refrigerating apparatus including a refrigerant conducting means, means for conducting the refrigerant in one direction through said conducting means, means for reversing the flow of said refrigerant through said conducting means, means for conducting the medium to be refrigerated progressively past said conducting means in a direction opposite to the flow of said refrigerant and means for reversing the flow of said medium to be refrigerated.

3. A refrigerating apparatus including a casing, refrigerant conducting means arranged in said casing, means for conducting the refrigerant in one direction through said conducting means, means for reversing the flow of refrigerant through said conducting means, means for conducting the medium to be refrigerated in one direction through said casing and progressively past said conducting means in a reverse direction to the flow of the refrigerating medium and means for reversing the flow of said medium to be refrigerated.

4. A refrigerating apparatus including a casing, coils arranged in said casing and adapted to conduct a refrigerant from one end of said casing to the other, refrigerant supply means, means for conducting air from one end of said casing to the other, means for reversing the flow of the refrigerant through said coils and means for reversing the flow of air through said casing.

5. A refrigerating apparatus including a casing, coils arranged in said casing, a refrigerant supply line, a refrigerant return line, valved means for conducting said refrigerant through said coils in either direction, an air supply duct, an air outlet duct and means for connecting said ducts alternately with opposite ends of said casing whereby the air can be passed opposite to the direction of flow of the refrigerant in either direction of the refrigerant flow.

6. A refrigerating apparatus including a casing of U-form having its opposite ends arranged adjacent one another, coils arranged in said casing, means for conducting a refrigerant through said coils and in one direction through said casing, means for reversing the flow of refrigerant through said coils, an air inlet duct adapted to communicate with both ends of said casing, valve means for alternately placing said air inlet duct in communication with the opposite ends of said casing, an air outlet duct adapted to communicate with both ends of said casing and valve means for alternately placing said air outlet duct in communication with the opposite ends of said casing whereby the air can be passed opposite to the direction of flow of the refrigerant in either direction of the refrigerant flow.

7. A refrigerating apparatus including a casing of U-form having its opposite ends arranged adjacent one another, coils arranged in said casing, means for conducting a refrigerant through said coils and in one direction through said casing, means for reversing the flow of refrigerant through said coils, an air inlet duct adapted to communicate with both ends of said casing, valve means adapted to be moved alternately to cut off communication of said air inlet duct with either end of said casing, an air outlet duct adapted to communicate with both ends of said casing, and valve means adapted to be moved alternately to cut off communication of said air outlet duct with either end of said casing and opposite to said air inlet duct whereby the air can be passed opposite to the direction of flow of the refrigerant in either direction of the refrigerant flow.

8. A refrigerating apparatus including a casing, a partition extending centrally through said casing from one end thereof and spaced from the opposite end thereof to form two compartments communicating at one end, coils arranged in said compartments, means for conducting a refrigerant serially through said coils, the flow of refrigerant being in one direction through one compartment and in the opposite direction through the opposite compartment, means for reversing the flow of refrigerant through said coils, an air inlet duct adapted to communicate with both of said compartments, valve means for alternately cutting off communication between said air inlet duct and either of said compartments, an air outlet duct adapted to communicate with both of said compartments and valve means adapted to be moved alternately to cut off communication between said air outlet duct and either of said compartments oppositely to said air inlet duct whereby the air can be passed through said compartments opposite to the direction of flow of the refrigerant in either direction of the refrigerant flow.

9. A refrigerating apparatus including a casing, a plurality of pairs of headers arranged in rows in said casing, tubes connecting each pair of headers and projecting into the space within said casing, a conduit connecting one header of each pair with the adjacent header of the next pair, means connecting the end headers with a source of refrigerant whereby the refrigerant is passed successively through the headers and tubes of each pair, and means for passing a current of air through said casing.

10. A refrigerating apparatus comprising a casing having two chambers arranged side by side and communicating with one another at corresponding ends, an air inlet at the opposite end of one chamber, an air outlet at the opposite end of the other chamber, a plurality of pairs of headers arranged one above the other in each chamber, hairpin tubes connecting each pair of headers, a conduit connecting one header of each pair with the adjacent header of the next pair, and means connecting the end headers with a source of refrigerant whereby the refrigerant is passed successively through the headers and tubes of each pair.

11. A refrigerating apparatus including a casing, a plurality of pairs of headers arranged in rows in said casing, tubes connecting each pair of headers and projecting into the space within said casing, each of said tubes having an extended surface, a conduit connecting one header of each pair with the adjacent header of the next pair, means connecting the end headers with a source of refrigerant whereby the refrigerant is passed successively through the tubes and headers of each pair from one end of said casing to the other, means for reversing the flow of refrigerant through said tubes, an air inlet at one end of said casing and an air outlet at the opposite end, said inlet and outlet conducting the air in the opposite direction to said refrigerant flow and means for reversing the direction of said air flow.

12. A refrigerating apparatus comprising a casing, coils arranged in said casing, said coils having an extended fin surface and being adapted to conduct a refrigerant from one end of said casing to the other, means for passing air through said casing in a reverse direction to the flow of the refrigerant and means for reversing the flow of both the refrigerant and the air.

13. A refrigerating apparatus including a refrigerant conducting means, means for conducting the medium being refrigerated progressively past said refrigerant conducting means and in a reverse direction to the flow of the refrigerant, valve means for reversing the flow of the refrigerant, valve means for reversing the flow of the medium being refrigerated and a valve operatively connected with each of said valve means and simultaneously actuating the same.

14. A refrigerating apparatus including a casing, a system of refrigerating coils arranged in said casing, means for conducting a refrigerant through said coils from one end of said casing to the other, means for conducting air in a reverse direction through said casing, valve means for reversing the flow of said refrigerant, valve means for reversing the flow of air and a valve for simultaneously actuating both of said valve means.

15. A refrigerating apparatus including a casing, a system of refrigerating coils arranged in said casing, means for conducting a refrigerant through said coils from one end of said casing to the other, means for conducting air in a reverse direction through said casing, a plurality of diaphragm valves arranged to reverse the flow of said refrigerant through said coils, valve means for reversing the flow of said air, at least one air motor actuating said valve means, an air pressure line connected to said diaphragm valves and said motor, a source of air pressure and a valve adapted alternately to connect said air pressure line with said source of pressure and with an exhaust whereby upon moving said last named valve from one position to another the flow of both the air and refrigerant are reversed.

16. In a refrigerating apparatus a casing formed to provide two chambers communicating with one another at corresponding ends and each being adapted to communicate with an air inlet and an air outlet at its opposite ends, valve means adapted alternately to place said chambers in communication with said air inlet, valve means adapted alternately to place said chambers in communication with said air outlet reversely to said inlet connections whereby the flow of air through said chambers can be reversed, at least one air motor actuating each of said air valve means, a coil arranged in said casing and adapted to conduct a refrigerant, a pipe connecting one end of said coil with a refrigerant inlet, another pipe connecting the opposite end of said coil with a refrigerant outlet, a cross pipe connecting the first end of said coil with the brine outlet, a second cross pipe connecting the second end of said coil with the refrigerant inlet, a diaphragm valve arranged in each of said pipes, the diaphragm valves in said cross pipes being reverse acting relatively to the other diaphragm valves, an air pressure line connecting each of said diaphragm valves and said motor, and a master valve in one position connecting said air pressure line with a source of air pressure and in another position with an exhaust, said parts being so organized that in one position of said master valve said refrigerant is conducted through said chambers in one direction and the air in the reverse direction and in the other position of said master valve the flow of both refrigerant and air is reversed.

17. In a refrigerating apparatus including a refrigerant supply line, a refrigerant return line and coils connected with said lines, means for reversing the flow of refrigerant through said coil comprising cross pipes cross connecting said lines with said coils and valve means adapted alternately to establish a direct flow of refrigerant through said lines and coils and a reverse flow through said cross pipes, lines and coils.

18. In a refrigerating apparatus including a refrigerant supply line, a refrigerant return line and coils connected with said lines, means for reversing the flow of refrigerant through said coil comprising cross pipes cross connecting said lines with said coils and two three-way valves each connected with one of said lines and one of said cross pipes, said three-way valves in one position being adapted to establish a direct flow of refrigerant through said lines and coils and in another position to establish a reverse flow through said cross pipes, lines and coils.

19. In a refrigerating apparatus including a refrigerant supply line, a refrigerant return line and coils connected with said lines, means for reversing the flow of refrigerant through said coil comprising cross pipes cross connecting said lines with said coils and two three-way diaphragm valves each connected with one of said lines and one of said cross pipes, said three-way valves in one position being adapted to establish a direct flow of refrigerant through said lines and coils and in another position to establish a reverse flow through said cross pipes, lines and coils, an air line connected with each of said diaphragm three-way valves and means for admitting pressure to said air line.

20. A refrigerating apparatus including two series of refrigerating conducting means, means for conducting the medium to be refrigerated progressively past each series of said refrigerant conducting means, means for cutting off the flow of refrigerant to the first series of refrigerant conducting means and establishing a counterflow of refrigerant in the other series of refrigerant conducting means and means for reversing the flow of the medium to be refrigerated, cutting off the flow of refrigerant to the series of refrigerant conducting means previously having the counterflow of the refrigerating medium and establishing a counterflow of the medium to be refrigerated through the previously dormant series of refrigerating means.

21. A refrigerating apparatus including a passage through which the medium to be refrigerated passes, a series of coils arranged at one end of said passage, a series of coils arranged at the opposite end of said passage, a refrigerant inlet line connected to the end of each of said series of coils, said refrigerant inlet lines being at the ends of said series of coils remote from one another in the direction of said passage, a refrigerant outlet line connected to the opposite end of each of said series of coils, means for establishing a flow of the medium to be refrigerated from one end of said passage to the other, means for rendering the first series of coils encountered by said air dormant, and for establishing a counterflow of the medium to be refrigerated through the other series of coils, said means permitting the flow of the medium to be refrigerated to be reversed, the flow of refrigerant to the previously cooled series of coils to be cut off and a counterflow of the refrigerating medium to be established through the previously dormant series of coils.

22. A refrigerating apparatus including a passage through which the medium to be refrigerated passes, a series of coils arranged at one end of said passage, a series of coils arranged at the opposite end of said passage, a refrigerant inlet line connected to the end of each of said series of coils, said refrigerant inlet lines being at the ends of said series of coils remote from one another in the direction of said passage, a refrigerant supply pipe, valve means for alternately establishing communication between said refrigerant supply pipe and each of said refrigerant inlet lines, a refrigerant outlet line connected to the opposite end of each of said series of coils, a refrigerant return pipe, valve means for alternately establishing communication between said refrigerant return pipe and each of said refrigerant outlet lines and means for establishing and reversing a flow of the mediums to be refrigerated through said passage.

In testimony whereof I affix my signature.

CLAUDE A. BULKELEY.